Apr. 17, 1923.
T. A. SPIKER ET AL
1,452,318
PUMP
Filed Oct. 20, 1921
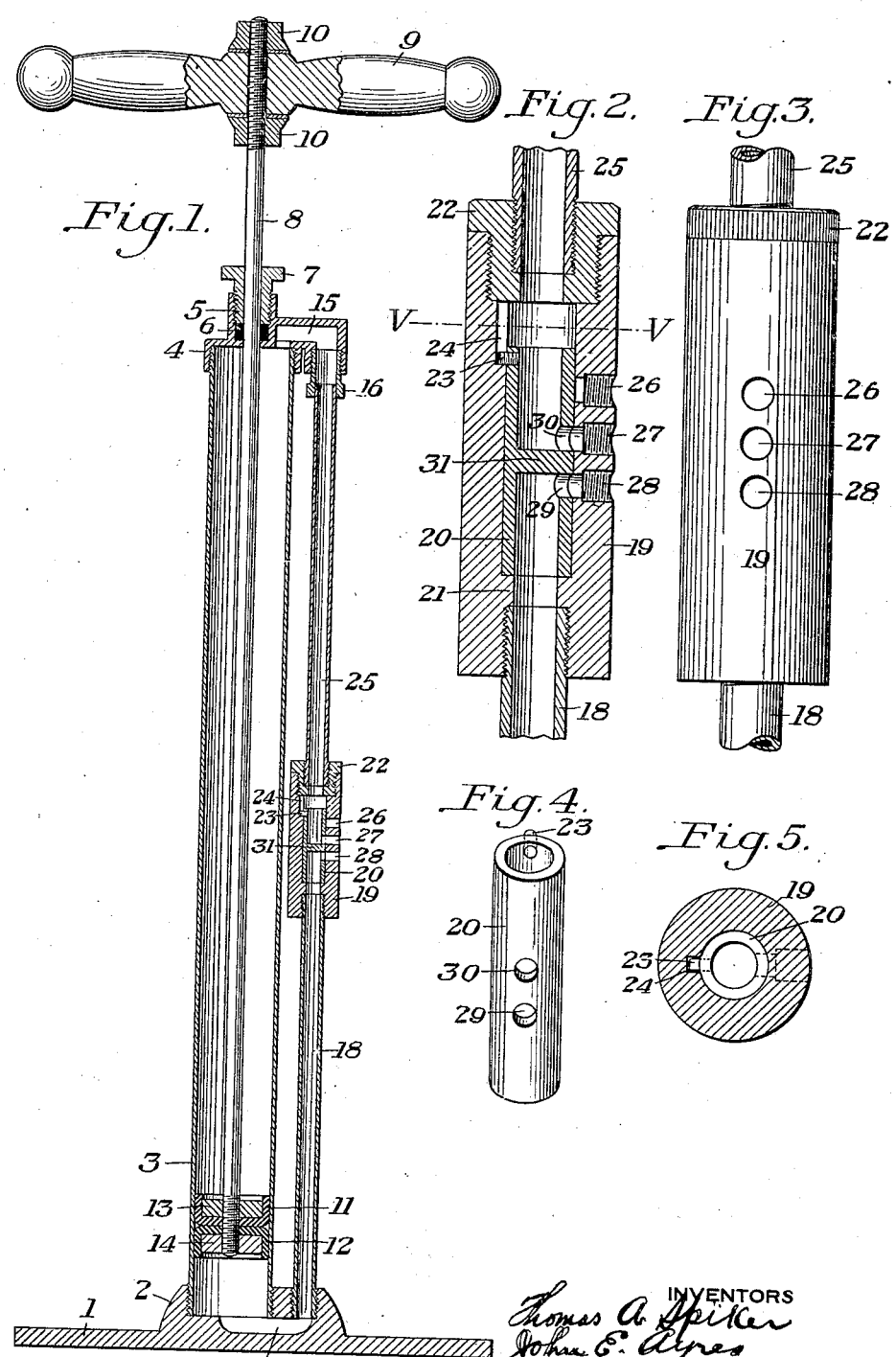

Patented Apr. 17, 1923.  1,452,318

UNITED STATES PATENT OFFICE.

THOMAS A. SPIKER, OF PITTSBURGH, AND JOHN E. AYRES, OF McDONALD, PENNSYLVANIA.

PUMP.

Application filed October 20, 1921. Serial No. 509,124.

*To all whom it may concern:*

Be it known that we, THOMAS A. SPIKER, of Pittsburgh, Allegheny County, and JOHN E. AYRES, of McDonald, Washington County, State of Pennsylvania, respectively, have invented new and useful Improvements in Pumps, of which the following is a full, clear, and exact description.

This invention relates to pumps for handling air, oil, water, gas, or any other fluid or vapor.

Our invention is particularly directed to the provision of a pump of few parts and simple construction. The pump is provided with a single valve device which renders the pump double acting and is of such construction that no other valves of any nature are required. This arrangement also simplifies the construction of the other parts of the pump and affords a device which is strong and durable.

Our invention will be better understood by reference to the following drawings, showing one embodiment thereof and in which Figure 1 is a sectional elevation of a pump embodying our invention;

Figure 2 is a section of the valve mechanism;

Figure 3 is a view showing the valve in elevation;

Figure 4 shows the movable member of the valve, and

Figure 5 is a section on line V—V Figure 2.

Referring to the drawings, the base 1 is provided with a boss 2, which is provided with screw threads and into which the main cylinder 3 is screwed. The upper end of the cylinder 3 is provided with screw threads and a head 4 is screwed on to the cylinder 3. The head 4 is provided with a stuffing box 5 in which may be placed any suitable packing material 6. A packing nut 7 is screwed into the stuffing box 5.

The piston rod 8 is provided at its upper end with a handle 9 held in place by nuts 10 screwed on to the piston rod 8. The piston rod extends into the cylinder 3 and is provided at its lower end with a piston composed of cups 11 and 12 placed in reversed position as shown in Figure 1. These cups are preferably composed of leather but any other suitable material may be used. The cups 11 and 12 are held in place by nuts 13 and 14 respectively which nuts are screwed on to the threaded lower end of the piston rod 8 and hold a portion of the cups therebetween.

The head 4 is provided with a passage 15, one end of which passage is screw-threaded to receive the threaded end of the nipple or union 16; the other end of passage 15 communicates with the cylinder 3.

The base 1 is provided with a passage 17, one end of which communicates with a tube or pipe 18 which is screwed into the base 1; the other end of the passage 17 communicates with the cylinder 3. The upper end of the tube 18 is screwed into a valve casing 19. The casing 19 is provided with an opening throughout the length thereof. Mounted in the interior of casing 19 is a valve member 20. The valve member 20 in the position shown in Figure 2 rests upon a stop 21. A bushing 22 is screwed into the upper end of the casing 19 and acts as a stop for the valve member 20 in its upward movements as will appear later. The valve member 20 is provided with a pin 23 which moves in a slot 24 in the sidewall of the casing 19. A tube or pipe 25 is connected at one end to the bushing 22 and at the other end with the nipple or coupling 16.

The valve casing 19 is provided with three openings 26, 27, and 28 in the side thereof. The valve member 20 is provided with two openings 29 and 30 and the member 20 is also provided with a partition 31. The openings 26, 27, and 28 are so spaced apart that when the valve member 20 is in the position shown in Figure 2 the openings 29 and 30 therein register with the openings 28 and 27 respectively in the casing and the partition 31 operatively separates the openings 27 and 28 from each other. When the valve member 20 is moved upwardly so that it engages the lower end of the bushing 22, the openings 29 and 30 in the valve member register respectively with the openings 27 and 26 in the casing and in that position of the valve member 20 the openings 26 and 27 are operatively separated from each other.

It will be noted that the openings 26, 27 and 28 are provided with screw threads so that any suitable piping or other connections may be made with these openings.

The operation of our device is as follows:

Upon lifting the piston through the piston rod and handle, the fluid inside the cylinder 3 is compressed and forced upwardly from the cylinder through the passage 15, tube 25 and opening 27 in the valve casing, the valve member 20 remaining in the position as shown in Figure 1. After the piston has reached its upper limit of movement the same is moved downwardly whereupon the reduction in pressure in the passage 15, tube 25 and opening 27, which is connected ordinarily with a valved passage, and the pressure created in the passage 17 and tube 18 cause the valve member 20 to move upwardly into contact with the lower end of the bushing 22, whereupon, the passage 28 is closed by the lower end of the valve member 20 and the openings 29 and 30 in the valve member register respectively with the openings 27 and 26, whereupon, the fluid passes outwardly through the passage 27 as before, but through the passage 17 and tube 18.

Upon reversal of movement of the piston in the cylinder the valve member 20 will again take the position shown in Figure 1 and the operation above described will be repeated.

While we have shown our pump as arranged for hand operation, we wish it understood that any suitable means may be provided so that the same may be operated by power.

From the foregoing description and the attached drawings it will be noted that our invention has many advantages among which may be noted that a double acting pump is provided and that the same contains only one valve structure; the valve structure for the pump is simple and rugged and automatic in operation; the pump contains very few parts; the piston for the main cylinder is free from valves and other similar operative and movable elements thus affording an efficient piston action and a simple piston construction. A solid piston rod is provided and the combination of the parts as shown and described constitute a simple and efficient device. Further advantages will be apparent to those skilled in the art.

Many detail changes may be made in the device without departing from the spirit of our invention.

We claim:

1. A double acting fluid pump comprising a cylinder, a piston therein, and a valve outside of the cylinder and connected thereto by cylinder connections at each end thereof and by conduits from the cylinder connections; the valve comprising a body connected to one of said conduits and having a chamber therein, a slide valve in the chamber adapted to be moved by the fluid, means for preventing rotation of the slide valve with respect to the body, said valve having openings adapted to provide fluid passages, said body having openings adapted to register with the openings in the slide valve according to the motion of the piston, and a cap for the body adapted to hold the slide valve therein and also limit its movement, said cap supporting the other conduit at one end, the second conduit having its other end adapted to slidingly fit into a cylinder connection whereby the cap may be attached to the body, substantially as described.

2. A double acting fluid pump comprising a cylinder, a piston therein, and a valve outside of the cylinder and connected thereto by coaxial cylinder connections at each end thereof and by conduits therefrom; the valve comprising a body connected to one of said conduits and having a chamber therein coaxial with said conduit, a slide valve in the chamber adapted to be moved by the fluid, means for preventing rotation of the slide valve with respect to the body, said slide valve having two openings adapted to provide fluid passages, said body having three openings adapted to register with the openings in the slide valve according to the motion of the piston, and a cap for the body adapted to hold the slide valve therein and also limit its movement, the cap carrying the second conduit coaxially with the valve and the first conduit; said second conduit having its end remote from the body adapted to slidingly fit into a cylinder connection whereby the cap may be screwed into the body and the remote end of the second conduit thereafter soldered to the cylinder connection, substantially as described.

In testimony whereof we have hereunto set our hands.

THOMAS A. SPIKER.
JOHN E. AYRES.